United States Patent
Gillespie et al.

(10) Patent No.: US 10,052,943 B2
(45) Date of Patent: Aug. 21, 2018

(54) ENGINE MOUNT

(71) Applicant: Hasport Performance, Inc., Phoenix, AZ (US)

(72) Inventors: Brian Gillespie, Phoenix, AZ (US); Keith Gillespie, Tempe, AZ (US)

(73) Assignee: Hasport Performance, Inc., Phoenix, AZ (US)

( * ) Notice: Subject to any disclaimer, the term of this patent is extended or adjusted under 35 U.S.C. 154(b) by 1 day.

(21) Appl. No.: 15/448,343

(22) Filed: Mar. 2, 2017

(65) Prior Publication Data
US 2017/0182877 A1    Jun. 29, 2017

Related U.S. Application Data

(63) Continuation-in-part of application No. 15/002,269, filed on Jan. 20, 2016, now Pat. No. 9,630,485.

(60) Provisional application No. 62/112,169, filed on Feb. 5, 2015.

(51) Int. Cl.
*B60K 5/12*    (2006.01)

(52) U.S. Cl.
CPC ......... *B60K 5/1283* (2013.01); *B60Y 2304/05* (2013.01)

(58) Field of Classification Search
CPC .... B60K 5/1283; B60K 5/1216; B62D 21/11; B60Y 2304/05
See application file for complete search history.

(56) References Cited

U.S. PATENT DOCUMENTS

| 4,572,321 A * | 2/1986 | Morita ..................... B60K 5/04 180/297 |
| 5,305,847 A * | 4/1994 | Mefford ............... B60K 5/1216 180/291 |
| 9,212,716 B2 * | 12/2015 | Yoon ....................... F16F 6/005 |
| 2004/0154855 A1 * | 8/2004 | Hirayu ................. B60K 5/1216 180/312 |

(Continued)

FOREIGN PATENT DOCUMENTS

GB    2524990 A  * 10/2015  ............... B60K 5/10

OTHER PUBLICATIONS

Hasport Performance, Inc.; DCLH Engine Mount, Sep. 2002, 1 Page, U.S.

(Continued)

*Primary Examiner* — Drew J Brown
(74) *Attorney, Agent, or Firm* — Steven N. Fox, Esq.

(57) ABSTRACT

An engine mount comprising a body having a cavity and a flange. The cavity comprises an opening having a central axis. The flange comprises bottom and top mounting surfaces and a centerline perpendicular to the central axis. The bottom mounting surface defines a first horizontal plane off-set from the central longitudinal axis. The flange further comprises a symmetric mounting hole pattern extending from the bottom mounting surface to the top mounting surface. The off-set and the symmetric mounting hole pattern allow a first use of the engine mount where the bottom surface of the flange is engaged directly with the engine mounting bracket and a second use of the engine mount where the top surface of the flange is engaged directly with the engine mounting bracket so that a different type of engine may be mounted.

10 Claims, 7 Drawing Sheets

(56) References Cited

U.S. PATENT DOCUMENTS

2015/0129331 A1* 5/2015 Konishi .................. B60K 5/12
                                                      180/54.1

OTHER PUBLICATIONS

Hasport Performance, Inc.; EGJ1 Engine Mount, Dec. 2008, 1 Page, U.S.

* cited by examiner

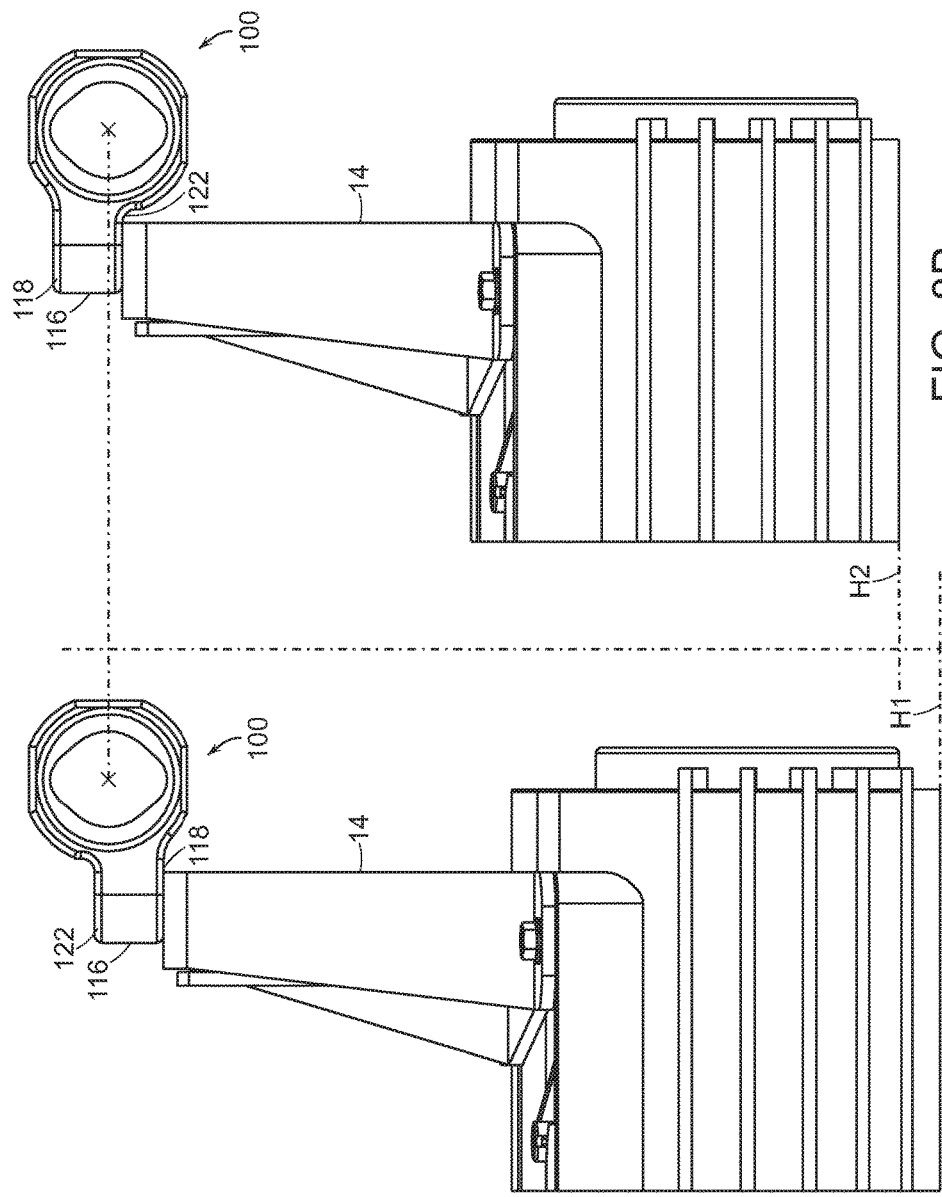

ENGINE MOUNT

CROSS-REFERENCE TO RELATED APPLICATIONS

This utility patent application claims the benefit of and priority to U.S. Utility patent application Ser. No. 15/002,269 filed on Jan. 20, 2016, now pending, which claims priority to U.S. Provisional Patent Application Ser. No. 62/112,169 filed on Feb. 5, 2015, now expired, both of which are hereby incorporated into this specification by reference in their entirety.

BACKGROUND OF THE INVENTION

Engine mounts are widely used to mount an engine to a vehicle such as a car. In some type of cars, the engine mount is mounted to a bracket that is mounted to a transmission of the engine. There are many reasons a customer may want to replace the engine in his/her vehicle with a different engine. This, however, presents a problem as different makes and models of engines are mounted in various positions within the vehicle's engine compartment and with different types of fastening hardware. Additionally, the location and design of the replacement engine may cause further problems in terms of fully integrating the engine with other vehicle systems. While each engine "swap" is unique and presents its own integration problems, common areas of concern are the mechanical linkage from the engine's drive-shaft to the drive-wheels of the vehicle, connection to the exhaust and air intake systems, and integration of hydraulic and electrical systems. As each swap scenario is unique, these problems had previously been solved with unique solutions. Many hours of measurement, design, fabrication, and other work may be spent on a single swap. Often, the product of all this labor is only useful in the one scenario for which the swap was performed. This means any particular engine swap project may even be customized to the point of being alone in the field. Given the amount of skill, time, and creativity necessary to produce these customized solutions, it is not surprising that an engine swap is usually an expensive proposition. Still, the popularity of engine swaps has led some manufacturers to produce kits that contain the necessary hardware to complete an engine swap. A typical kit contains many types of hardware including metal brackets, bushings, wiring harnesses, nuts, bolts, as well as a "mount" that acts as the mechanical fastening point between the engine and the body or frame of the vehicle. The design of these kits is dictated by the choice of engine to be swapped and the choice vehicle to receive that engine. Given the unique nature of each engine swap, a kit is typically useful for a particular engine to be swapped into a particular vehicle.

SUMMARY OF THE INVENTION

The present invention is an engine mount for use in mounting different types of engines to a vehicle with a single engine mounting bracket. The engine mount comprising a body having a cavity and a flange. The cavity comprises an opening having a central axis. The flange comprises bottom and top mounting surfaces and a centerline perpendicular to the central axis. The bottom mounting surface defines a first horizontal plane off-set from the central longitudinal axis. The flange further comprises a symmetric mounting hole pattern extending from the bottom mounting surface to the top mounting surface. The off-set and the symmetric mounting hole pattern allow a first use of the engine mount where the bottom surface of the flange is engaged directly with the engine mounting bracket and a second use of the engine mount where the top surface of the flange is engaged directly with the engine mounting bracket so that a different type of engine may be mounted. With the engine mount of the present invention, an engine with longer combustion cylinders may be easily swapped with an engine having shorter combustion cylinders by flipping or reversing the orientation of the engine mount.

BRIEF DESCRIPTION OF THE DRAWINGS

The description of the invention will be more fully understood with reference to the accompanying drawings in which:

FIG. 8A is a front view of the engine mount of the present invention in a low orientation with an available height H1.

FIG. 8B is a front view of the engine mount of the present invention in a high orientation with an available height H2.

DESCRIPTION OF THE INVENTION

Figure 1:
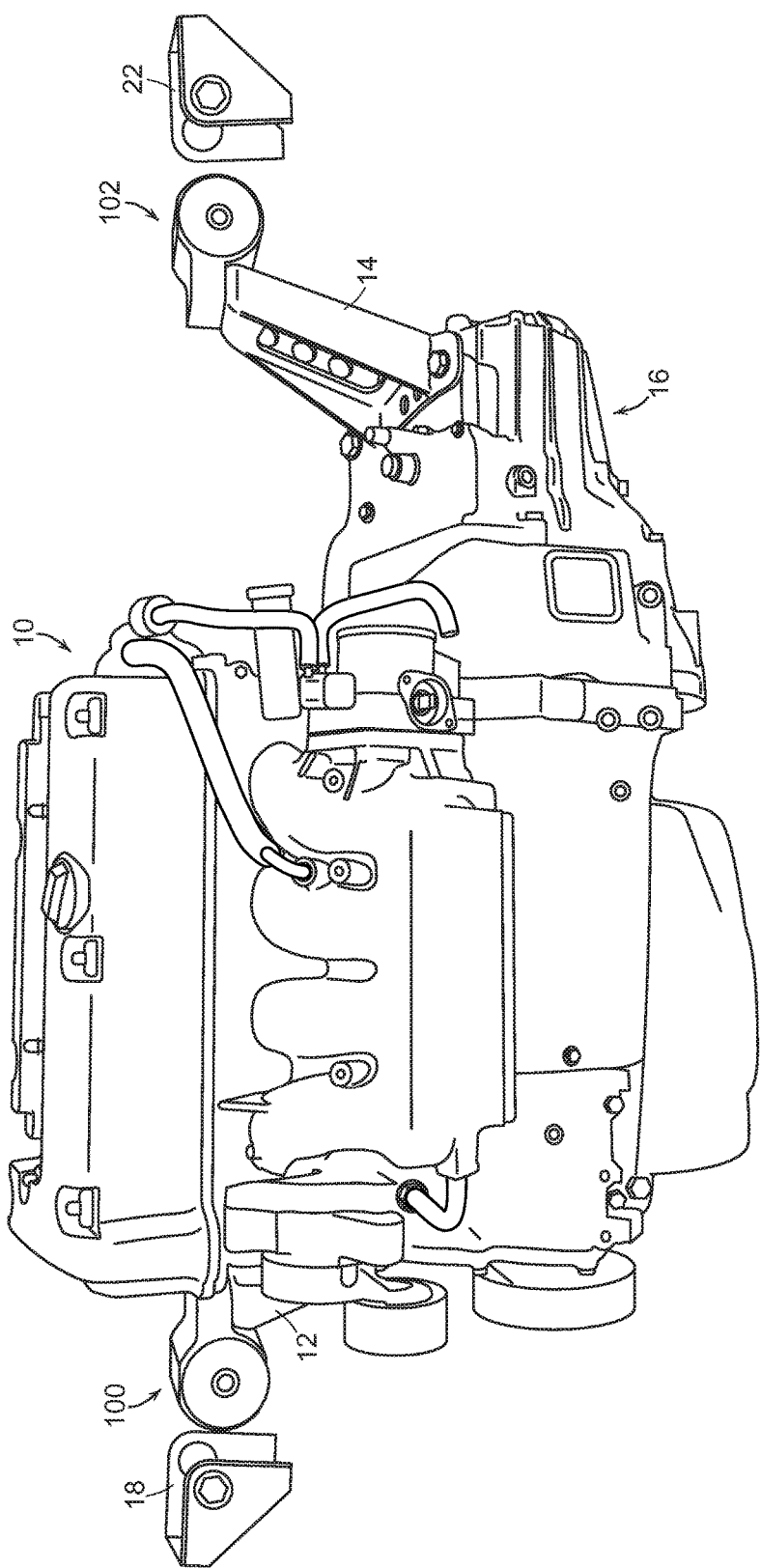
FIG. 1 is a perspective view of left and right engine mounts according to the present invention that mount a first type of engine to vehicle mounting brackets located within an engine compartment (not shown) of a vehicle (not shown). The engine has a left engine mounting bracket that receives the left engine mount and a right engine mounting bracket mounted to a transmission that receives the right engine mount. The left engine mount is identical to the right engine mount.

Referring to FIG. 1, the present invention is an engine mount 100 for use in mounting different types of engines to a vehicle. In the embodiment shown, left and right engine mounts 100 and 102 according to the present invention are engaged with left and right engine brackets 12 and 14 that are engaged to a first type of engine 10. Left engine bracket 12 is mounted directly to engine 10 while right engine bracket 12 is mounted to a transmission 16 which is mounted to engine 10. Left engine mount 100 is identical to right engine mount 102. As will be described more fully herein, the orientation of FIG. 1 is a "low orientation" of engine mounts 100 and 102 where less height is provided for engine 10. By "flipping" left and right engine mounts 100 and 102, a "high orientation" is provided that allow a simple way of swapping engine 10 with a different type of engine requiring increased height.

Figure 2:
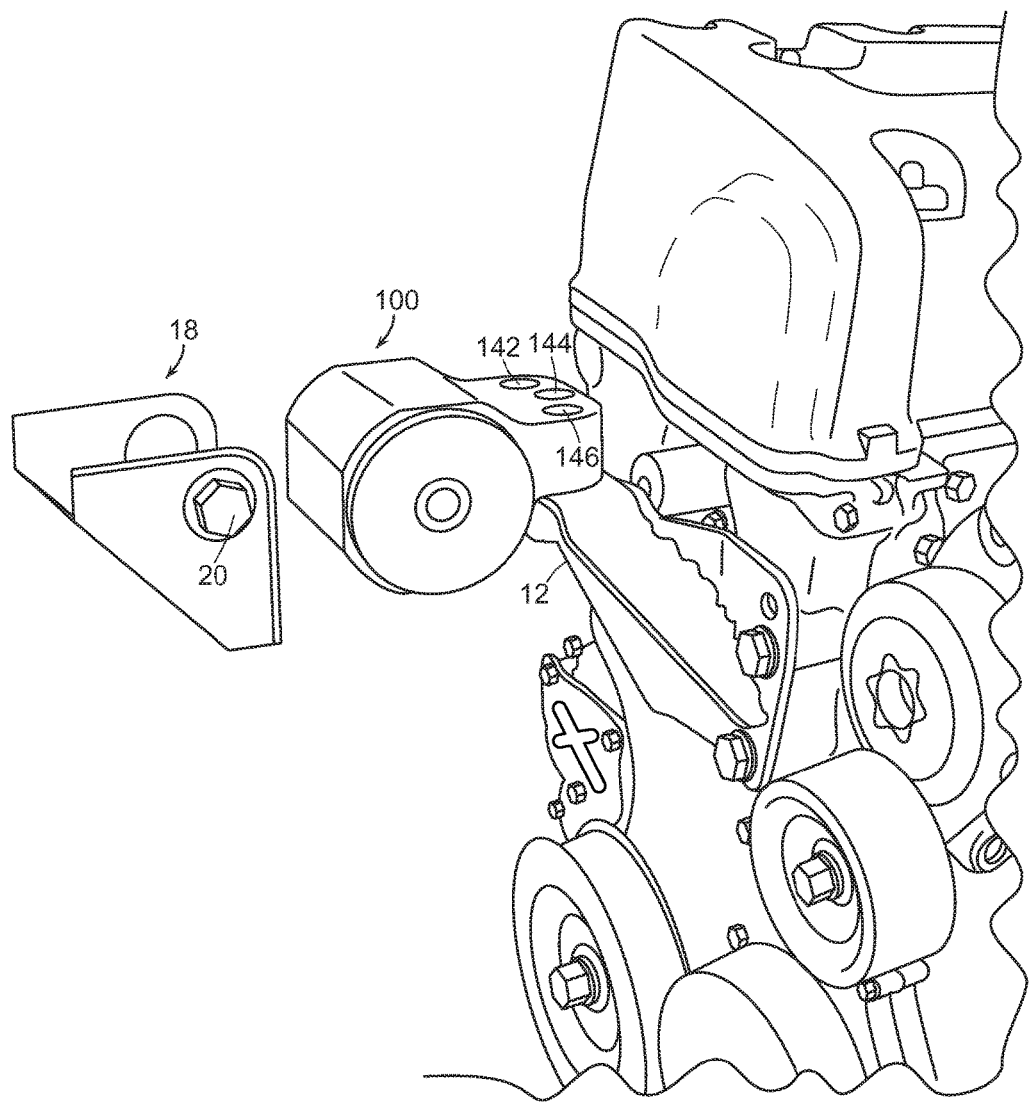
FIG. 2 is a perspective view of the left engine mount according to the present invention connected to the vehicle mounting bracket and the left engine mounting bracket that is connected directly to the engine.

Referring to FIG. 2, left engine mount 100 is secured to left engine bracket 12 by bolts 142, 144, and 146. Engine mount 100 is secured to a vehicle engine bracket 18 by a bolt 20.

Figure 3:
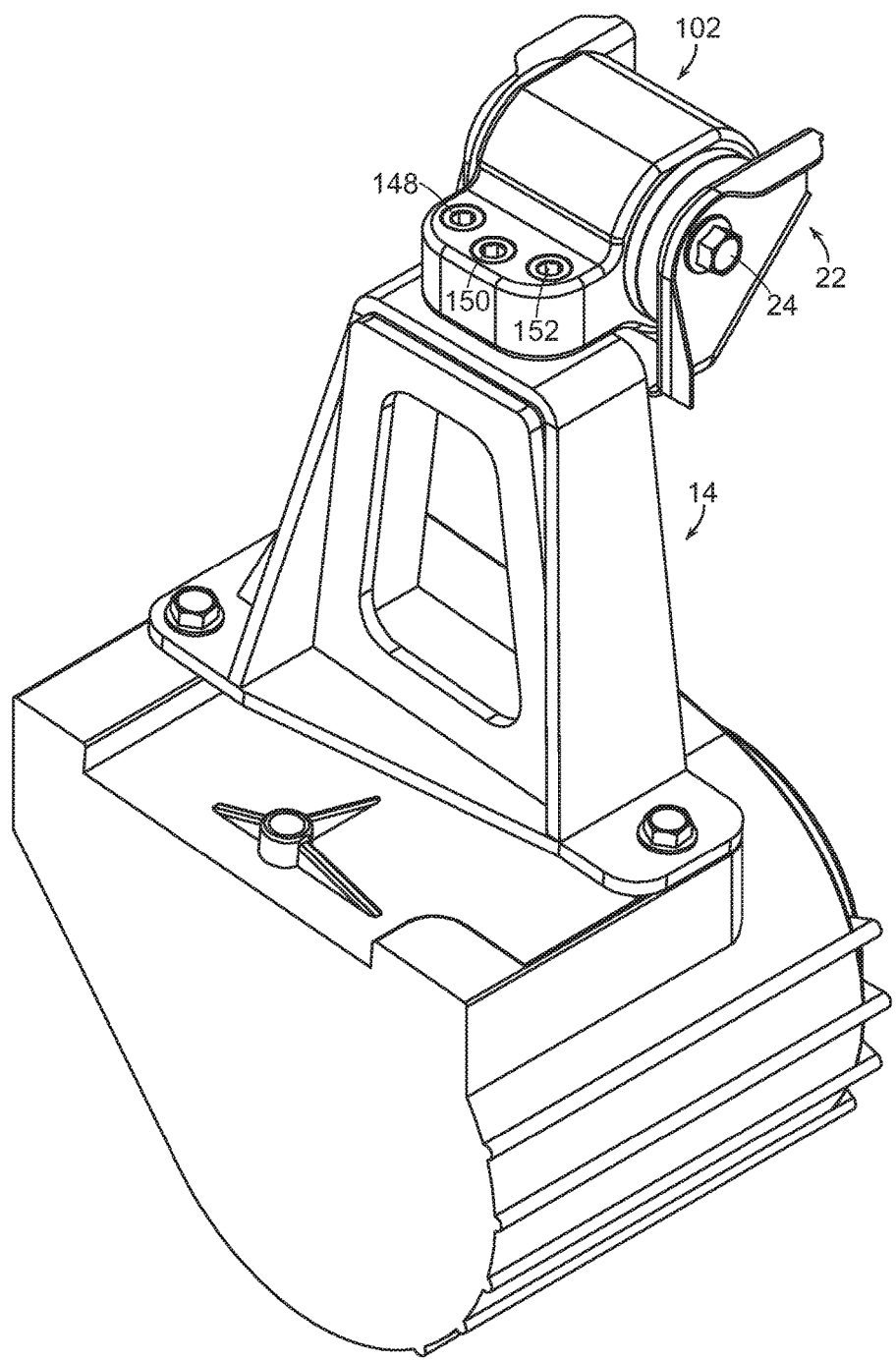
FIG. 3 is a perspective view of right engine mount according to the present invention engaged with the vehicle mounting bracket and the right engine mounting bracket that is connected to the transmission and instead of the directly to the engine.

Referring to FIG. 3, right engine mount 102 is secured to right engine bracket 14 by bolts 148, 150, and 152. Engine mount 100 is secured to a vehicle engine bracket 22 by a bolt 24.

Figure 4:
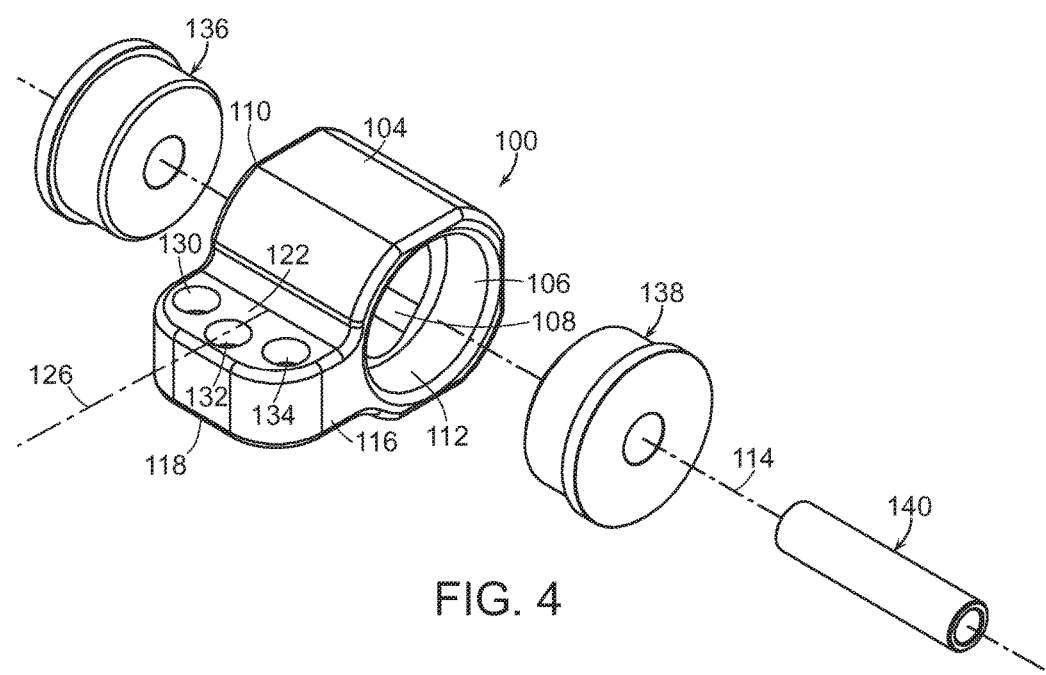
FIG. 4 is an exploded perspective view of the engine mount of the present invention comprising a body, two bushings, and a pin.

Referring to FIG. 4, engine mount 100 comprises a one-piece body 104 comprising a cavity 106 and a flange 116 extending outward from cavity 106. Cavity 106 comprises an opening or thru-hole 108 having first and second ends 110 and 112, a central longitudinal axis 114. Engine mount 100 further comprises first and second bushings 136 and 138 securely engaged with first and said ends 110 and 112, respectively, of opening 108. Engine mount 100 further comprises a pin 140 extending thru first and second bushings 136 and 138 that is adapted to receive a bolt for engagement with the vehicle engine bracket (FIGS. 1-3). Flange 116 comprises a bottom mounting surface 118, a top mounting surface 122 and a centerline 126 that is perpendicular to central longitudinal axis 114 of opening 108. Bottom mounting surface 118 defines a first horizontal plane 120 that is off-set from central longitudinal axis 114 of opening 108. Top mounting surface 122 defines a second horizontal plane 124 that is off-set from central longitudinal axis 114 of opening 108.

Figure 5:
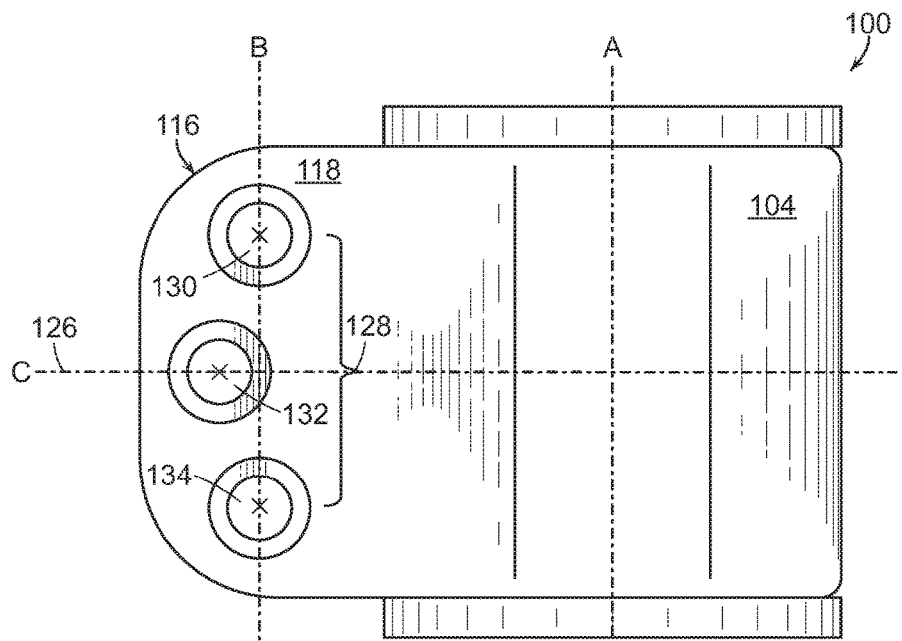
FIG. 5 is a top view of the engine mount according to the present invention showing the centerline of the flange and a symmetric mounting hole pattern so the engine mount may be flipped and used in either a low orientation or a high orientation.
Figure 6:
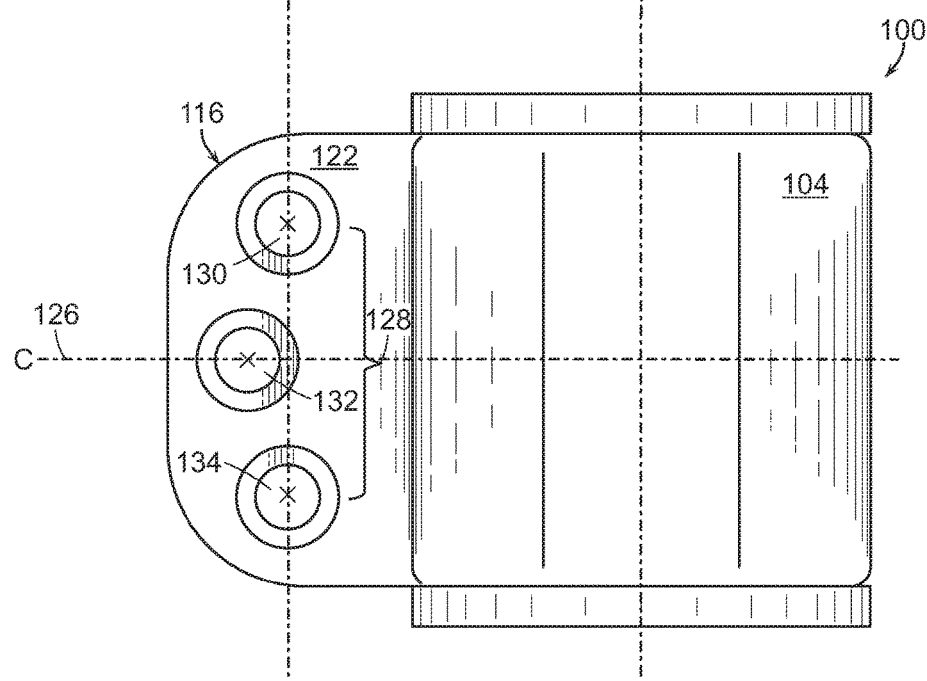
FIG. 6 is a bottom view of the engine mount according to the present invention showing the centerline of the flange and the symmetry of all the mounting holes of the flange relative to the centerline so that the engine mount may be flipped and used in either a low or high orientation.

Referring to FIGS. 4 and 5, flange 116 further comprises a symmetric mounting hole pattern 128 extending from bottom mounting surface 118 to top mounting surface 122. Symmetric mounting hole pattern 128 allows a first use of engine mount 100 where bottom mounting surface 118 of flange 116 is engaged directly the engine mounting bracket (the "low orientation") and a second use of engine mount 100 where top surface 122 of flange 116 is engaged directly with the engine mounting bracket (the "high orientation") so a different type of engine can be mounted. In the embodiment shown, symmetric mounting hole pattern 128 comprises a first mounting hole 130, a second mounting hole, 132, and a third mounting hole 134 extending from bottom mounting surface 118 to top mounting surface 122. First mounting hole 130 is symmetric to second mounting hole 132 relative to centerline 126 of flange 116 and third mounting hole 134 is centered on centerline 126 thereby allowing bottom mounting surface 118 or top mounting surface 122 of flange 116 to be engaged directly with the engine mounting bracket. A first engine can be swapped for a different engine without having to change engine mounts—one only needs to change the orientation of the engine mount. With the engine mount of the present invention, an engine with longer combustion cylinders may be easily swapped with an engine having shorter combustion cylinders by flipping or reversing the orientation of the engine mount. One-piece body 102 is made from metal such as steel or aluminum and may be made by conventional processes such as casting and machining operations.

Figure 7:
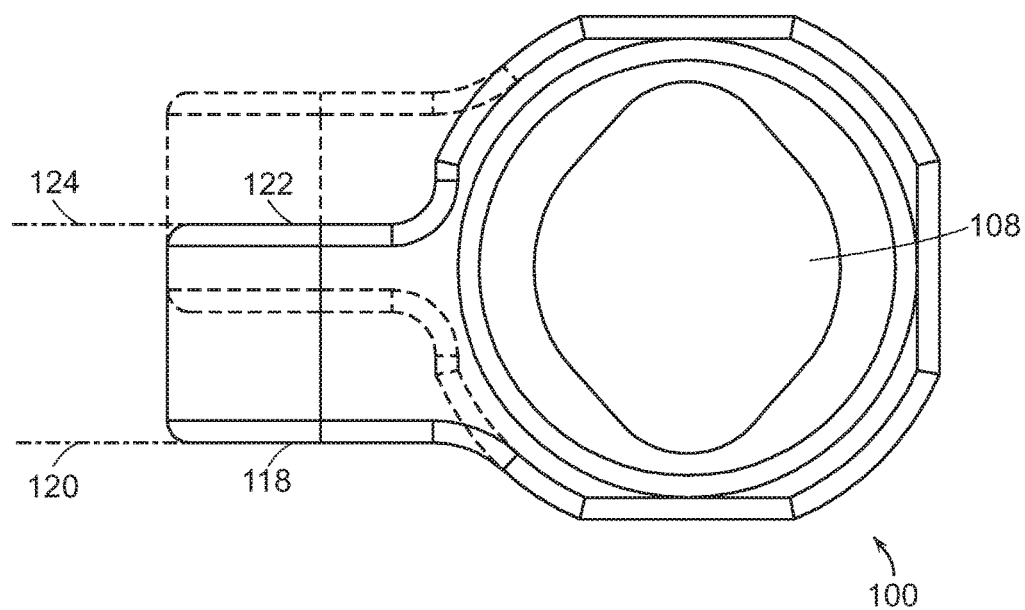
FIG. 7 is a front and superimposed view of the engine mount of the present invention in the low and high orientations.

Referring to FIG. 7, engine mount 100 in the high orientation is superimposed about on engine mount 100 in the low orientation. As shown, flipping and usage of engine mount 100 in either the high or low orientation does not change the position of opening 108 of cavity 106.

Referring to FIGS. 8A and 8B, flange 114 may be used in a low orientation or position (FIG. 8A) where bottom mounting surface 118 of flange 116 is mounted to bracket 14 thereby fixing the available height to a height H1 to receive a first type of engine. When engine mount 100 is flipped and used as shown in FIG. 8B, top mounting surface 122 is mounted directly to bracket 14 thereby increasing the available height to a height H2 to receive a different type of engine (not shown). For example, the low orientation of flange 116 shown in FIG. 8A may be used for engine types having smaller combustion cylinders while the high orientation or position of flange 116 shown in FIG. 8B may be used for engine types having longer combustion cylinders.

Bushings 136 and 138 are of known design and that they may be made of rubber, metal or any material that is strong and stiff enough to withstand compressive loads due to engine weight and resistance to engine torque while in operation. Optionally, as a known practice, bushings 136 and 138 may be made of rubber or similar materials of varying hardness in an effort to isolate engine vibration from the vehicle. In another embodiment, the engine mount 100 may attach directly to the vehicle without incorporating pin 140 and/or bushings 138 and 138. Pin 140 may be made of metal, plastics, or of any other material rigid and strong enough to prevent contact between the bushings 136 and 138 and the bolt which attaches to the vehicle when subjected to any load caused directly or indirectly by the engine.

While particular embodiments of the invention have been shown and described, it will be obvious to those skilled in the art that changes and modifications may be made without departing from the scope of the claimed invention.

What is claimed:

1. An engine mount for use mounting different types of engines having an engine mounting bracket within an engine compartment of vehicle having an engine mounting bracket, the engine mount comprises: a body comprising a cavity and a flange extending outward from said body; said cavity comprises opening having a central longitudinal axis; said flange comprises bottom and top mounting surfaces and a centerline perpendicular to said central longitudinal axis of said opening; said bottom mounting surface defining a first horizontal plane off-set from said central longitudinal axis of said opening; said flange further comprises a symmetric mounting hole pattern extending from said bottom mounting surface to said top mounting surface; and said off-set and said symmetric mounting hole pattern allow a first use of the engine mount where said bottom surface of said flange is engaged directly with the engine mounting bracket and a second use of the engine mount where said top surface of said flange is engaged directly with the engine mounting bracket.

2. The engine mount of claim 1, wherein said symmetric mounting hole pattern further comprises first and second mounting holes extending from said bottom mounting surface to said top mounting surface; said first mounting hole is symmetric to said second mounting hole relative to said centerline of said flange.

3. The engine mount of claim 2, wherein said symmetric mounting hole pattern further comprises a third mounting hole extending from said bottom mounting surface to said top mounting surface and aligned with said centerline of said flange.

4. The engine mount of claim 3, further comprising first and second bushings engaged with said opening.

5. The engine mount of claim 4, wherein said opening comprises first and second ends;

said first and second bushings being engaged with said first and second ends, respectively.

6. The engine mount of claim 5, further comprising a pin engaged with said first and second bushings.

7. The engine mount of claim 6, wherein said bottom mounting surface of said flange is planar.

8. The engine mount of claim 7, wherein said top mounting surface of said flange is planar.

9. The engine mount of claim 1, wherein said opening is circular shaped.

10. The engine mount of claim 1, wherein said body is one-piece.

\* \* \* \* \*